(12) United States Patent
Caracciolo et al.

(10) Patent No.: US 6,193,852 B1
(45) Date of Patent: *Feb. 27, 2001

(54) OZONE GENERATOR AND METHOD OF PRODUCING OZONE

(75) Inventors: Louis D. Caracciolo, Atco, NJ (US); Willy J. Masschelein, Brussels (BE)

(73) Assignee: The BOC Group, Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/864,434

(22) Filed: May 28, 1997

(51) Int. Cl.$^7$ ..................................... B01J 19/08
(52) U.S. Cl. ............... 204/176; 422/186.11; 422/186.2; 422/186.19
(58) Field of Search .................. 204/176; 422/186.11, 422/186.2, 186.19

(56) References Cited

U.S. PATENT DOCUMENTS

| | | | |
|---|---|---|---|
| 2,876,188 | * 3/1959 | Thorp et al. | 422/186.11 |
| 4,132,637 | 1/1979 | Key et al. | 210/7 |
| 4,213,838 | 7/1980 | Lowther | 204/176 |
| 4,256,574 | 3/1981 | Bhargava | 210/614 |
| 4,352,740 | 10/1982 | Grader et al. | 210/760 |
| 4,614,573 | * 9/1986 | Masuda | 4/186.19 |
| 4,863,497 | 9/1989 | Grenier et al. | 55/181 |
| 4,869,881 | 9/1989 | Collins | 4/4 |
| 4,954,321 | 9/1990 | Jensen | 422/186.19 |
| 4,988,484 | 1/1991 | Karlson | 422/186.19 |
| 5,004,587 | 4/1991 | Tacchi | 412/186.19 |
| 5,008,087 | 4/1991 | Batchelor | 4/4 |
| 5,052,382 | 10/1991 | Wainwwright | 422/186.19 |
| 5,069,880 | 12/1991 | Karlson | 4/4 |
| 5,089,098 | 2/1992 | Tacchi | 204/176 |
| 5,094,822 | 3/1992 | Dunder | 422/186.22 |
| 5,106,589 | 4/1992 | Conrad | 4/186.11 |
| 5,181,989 | 1/1993 | White et al. | 162/241 |
| 5,203,972 | 4/1993 | Shimamune et al. | 204/129 |
| 5,245,845 | 9/1993 | Langford | 68/207 |
| 5,295,792 | 3/1994 | Shackford | 417/55 |
| 5,296,097 | 3/1994 | Friend | 162/18 |
| 5,332,555 | 7/1994 | Hosokawa et al. | 422/186.11 |
| 5,366,702 | 11/1994 | Rimpler | 11/186.07 |
| 5,366,703 | * 11/1994 | Liechti et al. | 4/186.11 |
| 5,368,815 | 11/1994 | Kasting, Jr. et al. | 4/3 |
| 5,370,846 | * 12/1994 | Yokomi et al. | 4/186.07 |
| 5,403,441 | 4/1995 | McDonald | 162/38 |
| 5,409,673 | 4/1995 | Mausgrover et al. | 4/186.07 |
| 5,411,713 | 5/1995 | Iwanaga | 422/186.15 |
| 5,415,783 | 5/1995 | Johnson et al. | 210/699 |
| 5,417,936 | 5/1995 | Suzuki et al. | 422/186.07 |
| 5,427,693 | 6/1995 | Mausgrover et al. | 4/186.3 |
| 5,431,861 | 7/1995 | Nagahiro et al. | 261/140.1 |
| 5,435,978 | 7/1995 | Yokomi | 4/4 |
| 5,443,800 | 8/1995 | Dunder | 4/186.16 |
| 5,445,798 | 8/1995 | Ikeda et al. | 4/121 |
| 5,460,705 | 10/1995 | Murphy et al. | 204/252 |
| 5,478,533 | 12/1995 | Inculet | 4/186.07 |
| 5,484,549 | 1/1996 | Hei et al. | 252/103 |
| 5,855,856 | * 1/1999 | Karlson | 422/186.11 |

FOREIGN PATENT DOCUMENTS

| | | |
|---|---|---|
| 0 498 585 A2 | 8/1992 | (EP) . |
| 929194 | 1/1961 | (GB) . |
| 955825 | 4/1961 | (GB) . |
| 8-026704 * | 1/1996 | (JP) . |

* cited by examiner

Primary Examiner—Kishor Mayekar
(74) Attorney, Agent, or Firm—Finnegan, Henderson, Farabow, Garrett & Dunner, LLP

(57) ABSTRACT

The present invention is a low temperature ozone generator using a cryogenic cooling medium. The present invention also provides an efficient method of producing ozone using a cryogenic cooling medium. Finally, the invention is to a method for producing ozone efficiently using liquid nitrogen as the cooling medium.

17 Claims, 2 Drawing Sheets

OZONE GENERATOR AND METHOD OF PRODUCING OZONE

FIELD OF THE INVENTION

The present invention relates to an ozone generator. The present invention further relates to a low temperature ozone generator with improved ozone output. The present invention still further relates to a method of producing ozone using a cryogenic cooling medium.

BACKGROUND OF THE INVENTION

Ozone finds a wide variety of uses due to its very strong oxidant properties. Common uses for ozone include oxide film formation, e.g., semiconductor film formation, sterilization, and waste water treatment. A wide variety of methods have been proposed to generate ozone efficiently. The quantity of ozone produced by a given process or generator depends on a number of factors such as reactant gas concentration, electric power applied, temperature and gas flow rate.

Though a strong oxidant, ozone is not particularly stable and tends to decompose at elevated temperatures to reform diatomic oxygen. To achieve higher ozone concentrations, some propose to increase power density to the generator. While resulting in higher ozone concentrations, this approach requires significantly more power input and also results in higher system temperatures. As the temperature of the exit gas stream increases, so too does the decomposition of the ozone formed by the process.

Some form of cooling is typically used in the industry to withdraw unwanted heat produced during ozone generation. Cooling can be accomplished by varying the flow rate or flow path of the reactant gas through the generator. One example of this cooling method can be found in U.S. Pat. No. 4,213,838. Other gas driven cooling configurations include countercurrent flow of the reactant gas behind the dielectric members, as proposed in U.S. Pat. No. 5,008,087. However, the most common method for removing unwanted heat is the use of a fluid coolant, most often room temperature water. One example of water cooling is the jacket cooling arrangement described in U.S. Pat. No. 4,954,321.

U.S. Pat. No. 5,366,703 suggests that the efficient production of ozone can be accomplished using gas compression. This arrangement introduces a reactant gas into a generator at a pressure of between 1 and 3 bar and at a temperature of not greater than 50° C. The gas is subjected to ozone generation and is then isothermally compressed to result in an ozone containing stream having a temperature not greater than the temperature of the feed gas and a pressure of at least 3 bar. This process however, suffers from the disadvantage that it requires both compression and cooling to obtain reasonable ozone concentrations.

The present invention overcomes the disadvantages of the prior art and produces higher ozone concentrations without the additional process of gas compression. Furthermore, the present invention improves the concentration of generated ozone by manipulating the temperature and concentration of the reactant gas.

SUMMARY OF THE INVENTION

The present invention provides an ozone generator cooled by a cryogenic cooling medium, such as liquid nitrogen, to improve the concentration of ozone produced with a given reactant stream.

The present invention also provides a method of increasing ozone production by not only using a cooling medium at temperatures below about 0° C. to cool the ozone generator, but, in some cases, also mixing coolant with the reactant gas to reduce the temperature of the reactant gas stream without affecting the available oxygen for ozone production.

To achieve these and other advantages and in accordance with the purposes of the invention, as embodied and broadly described herein, there is disclosed:

An ozone generator including ozone generation means having associated therewith means for introducing a reactant gas; means for contacting the ozone generation means with a cooling medium at not greater than about 0 C. means for withdrawing a portion of the cooling medium after it has contacted said generation means; means for converting the extracted cooling medium to a gaseous coolant and means for introducing the gaseous coolant to the reactant gas stream.

There is further disclosed:

A method for producing ozone including providing a stream of reactant gas containing oxygen; contacting the reactant gas with an ozone generation means to convert a portion of the reactant gas to ozone; contacting the ozone generation means with a cooling medium at not greater than about 0 C. to cool the ozone; removing the cooling medium after it contacts the ozone generation means; converting the cooling medium to a gaseous coolant and introducing at least a portion of the gaseous coolant into the stream of reactant gas.

There is still further disclosed:

A method for producing ozone including providing a stream of reactant gas containing oxygen; contacting the reactant gas with an ozone generation means to convert a portion of the reactant gas to ozone; contacting the ozone generation means with a cooling medium at not greater than about 0° C. to cool the ozone; removing the cooling medium after it contacts the ozone generation means; and cooling the ozone gas stream after it exits the ozone generator with at least a portion of the cooling medium.

There is also disclosed:

A method for producing ozone including flowing reactant gas containing oxygen into an ozone generator to convert a portion of the reactant gas to ozone; contacting the ozone generator with a cooling medium at not greater than about 0° C. to cool the ozone; and withdrawing a product stream containing the ozone generated in the ozone generator.

Further advantages of the invention will be set forth in part in the description which follows and in part will be apparent from the description, or may be learned by practice of the invention. The advantages of the invention may be realized and attained by means of the instrumentalities and combinations particularly pointed out in the appended claims.

The accompanying drawings, are included to provide a further understanding of the invention and are incorporated in and constitute a part of the specification. The drawings illustrate embodiments of the invention and, together with the description, serve to explain the principles of the invention.

DETAILED DESCRIPTION

Figure 1:
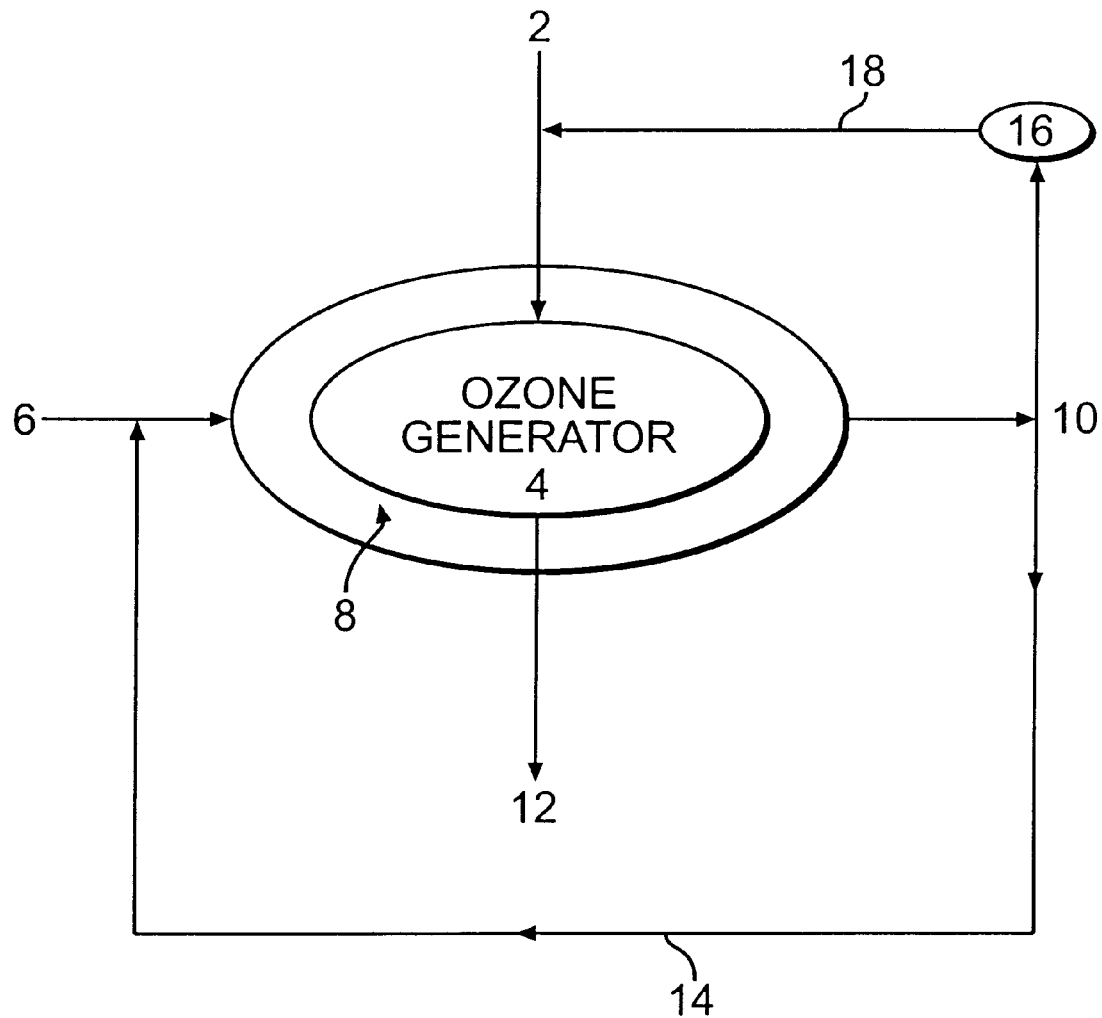
FIG. 1 is a schematic illustration of an ozone generation system for practicing the process according to the invention.

The present invention is directed to an ozone generation system and method capable of producing ozone more efficiently at higher concentrations. FIG. 1 is a schematic representation of one preferred ozone generation system according to the present invention. A reactant gas inlet 2 is coupled to an ozone generator 4 so that reactant gas, containing oxygen, flows into and through the ozone generator 4. As reactant gas passes through ozone generator 4, ozone generator 4 is cooled by a cooling medium, e.g., glycol or liquid nitrogen, passing through inlet 6 into housing 8. The cooling medium passes between the housing 8 and the ozone generator 4 to cool the ozone generator 4, generated ozone, and the reactant gas stream passing therethrough. The ozone generated during the process passes through outlet 12. After cooling the ozone generator 4, the cooling medium is removed through outlet 10. Ozone generator 4 creates ozone in the reactant gas stream by subjecting the oxygen containing reactant gas stream to a corona discharge. The cooling medium is recirculated from outlet 10 through conduit 14 to inlet 6 of ozone generator 4. Part of the cooling medium from outlet 10, if it is compositionally appropriate, e.g., liquid nitrogen, can be fed to expander 16. Expander 16 converts the cooling medium, for example liquid nitrogen, to gaseous form which can be fed through conduit 18 to inlet 2 of ozone generator 4. At the inlet 2, the gaseous cooling medium is mixed with the reactant gas to supercool the reactant gas.

Mixing of the gaseous cooling medium with the reactant gas stream can be accomplished with any art recognized apparatus including, for example, a three way fluid coupler, a metering valve, a fixed orifice, mass flow controller and gas proportioners. The skilled artisan can readily select appropriate structures to handle potential pressure differentials and safely and effectively combine oxygen with the gaseous cooling medium. This lowers the temperature of the ozone generator 4 and the generated ozone so that more ozone forms without being decomposed to form diatomic oxygen.

The ozone generator 4 can be any structure of a conventional type. Ozone generators used with the present invention should be capable of withstanding the lower temperatures associated with the method according to the present invention. Appropriate materials of construction and/or modifications to conventional ozone generators are be well understood by the skilled artisan.

Preferred ozone generators for use in the present invention include silent discharge type generators in which a dielectric is placed between a pair of electrodes, a voltage is impressed between the electrodes and oxygen is passed through a discharge space created between the electrodes, thereby generating ozone. The electrodes generally comprise metallic material having a dielectric coating and may be arranged in parallel to form a plate type ozonator. Examples of other corona discharge based ozone generators include plate and tubular type or flat tube configurations. These and other configurations will be readily understood by the skilled artisan.

The ozone generator 4 may also be a tubular ozone generator in which an elongated central electrode functioning as a cathode is subjected to high voltage by an encircling outer cylindrical electrode grounded to function as an anode. In the elongated annular reaction space formed between the central cathode and the cylindrical anode, electrical discharge is induced to generate ozone from a feed gas in the reaction space. Preferably, the central cathode terminal is sealed in a dielectric envelope made, for example, of borosilicate glass.

In one preferred tubular type ozone generator for use in the present invention, electrical discharge related to the high voltage applied at the cathode terminal is not contained in the dielectric envelope and does not interact with feed gas to produce ozone. Instead, other corresponding electrical discharges are induced outside of the dielectric envelope by the activity within the envelope. It is there, in an annular reaction space located between the exterior of the dielectric envelope and the interior of the cylindrical anode, that an electrical discharge generates ozone.

Ozone generators for use in the present invention should be capable of withstanding the expansion and contraction that occurs when using a cooling medium that can be both in the liquid and gaseous states. Furthermore, ozone generators for use with the present invention must minimize leaking of the cooling medium or ozone from the system. Preferred systems include an apparatus having leakproof seals such as those achieved by welding or providing gasketing means to minimize the amount of system losses.

The ozone generator is typically contained within a housing. The housing is made from any materials appropriate to withstand the temperatures during ozone formation and is chemically neutral with respect to the materials coming in contact the housing. Suitable materials of construction include borosilicate glass, stainless steel, carbon steel, aluminum, copper, brass, bronze, polytetrafluoroethylene (PTFE), Ultra-high molecular weight polyethylene (UHMWPE), fluorinated ethylene-propylene (FEP), perfluoroalkoxy fluorocarbon (PFA), chlorotrifluorethylene (CTFE), and VESPEL (ultra-high-performance polyimide).

The cooling medium, preferably selected from liquid nitrogen, liquified air, liquid oxygen, glycol, liquid $CO_2$, or gaseous $CO_2$, is fed into the system from a holding tank (not shown). The cooling medium is used to cool the ozone generator 4 and is preferably introduced into the reactant gas stream. In a preferred embodiment, the cooling medium is a cryogenic recirculated through the system. The temperature of the cooling medium is from about $-193°$ C. to about $0°$ C., more preferably from about $-80°$ C. to about $-1°$ C., and most preferably from about $-75°$ C. to about $-40°$ C. For purposes of the present invention, cryogenic refers to cooling mediums that are used at a temperature of $0°$ C. or below.

Cooling medium withdrawn from the housing 8 passes into the holding tank and is preferably fed to a heat exchanger 16 that is used to evaporate the cooling medium, e.g., converting liquid nitrogen to its gaseous form.

The process can be run isobaric or isochoric. If an isobaric process is selected, the apparatus used with the present invention is preferably capable of dealing with expansion of the cooling medium. In isobaric processes, for example, using liquid nitrogen, the expansion at 29 lb/in$^2$ can be between about 3.5 ft$^3$/lb at $-189°$ F. and about 8 ft$^3$/lb at $80°$ F. If an isochoric process is selected, the apparatus used with the present invention is preferably capable of withstanding the increased pressure associated with keeping the volume of the cooling medium constant. In liquid nitrogen processes, typical pressures can reach, for example, 450 to 800 lb/in$^2$.

The gaseous coolant can also be used to regulate the discharge temperature of the ozone containing stream. When gaseous nitrogen is used to control the temperature of the discharge stream of ozone containing gas, often a separate housing will be used to provide a contact area between the nitrogen gas and the discharge stream of ozone. The coolant gas may be added to the gas stream thereby diluting it or it may be used as a heat exchange medium.

The gaseous coolant can also be added to the inlet reaction gas stream. In this embodiment of the invention, the coolant gas serves both as a diluent gas and as a cooling medium for the reactant gas stream. By diluting the oxygen reactant gas stream, the coolant can serve to reduce the expense of the reactant gas without any loss of process efficiency. Furthermore, since the process is temperature dependent the use of a coolant gas to pre-cool the reactant gas stream further increases process efficiency. Gaseous coolant may be added to the reactant gas stream in an amount of not greater than about 12% by volume, more preferably in an amount not greater than about 10% by volume and most preferably in an amount of from about 5% by volume to about 10% by volume. The inclusion of a gaseous coolant does not impair and in fact improves the efficiency of the ozone production.

The reactant gas stream contains oxygen. The reactant gas stream preferably contains oxygen in an amount of at least about 90% by volume, more preferably in an amount of at least about 91%, most preferably in an amount of at least about 95%. Oxygen for use in the present invention should contain only 15 ppm or less by volume index of hydrocarbons based upon a methane of $CH_4$ measure.

Figure 2:
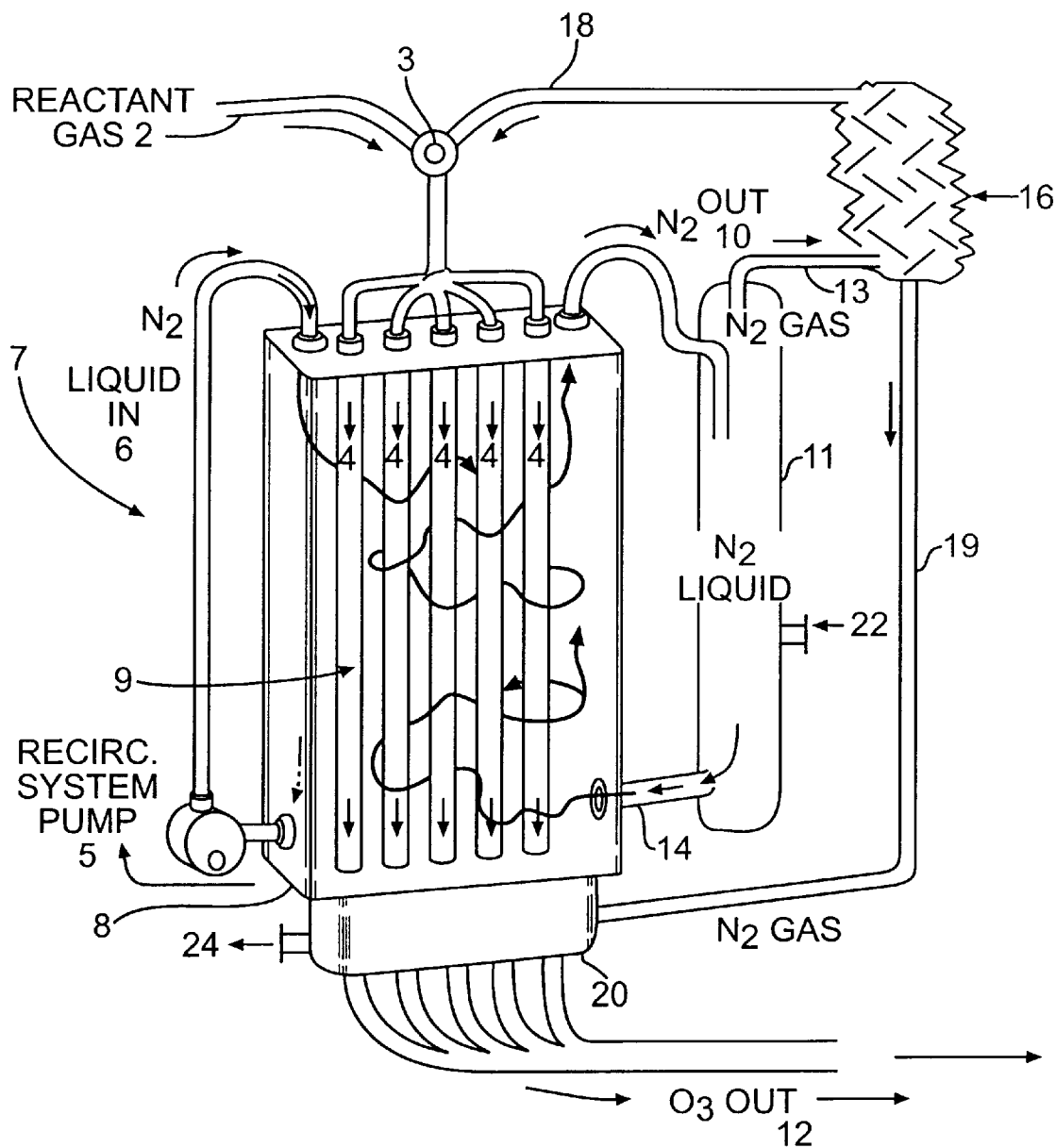
FIG. 2 illustrates an ozone generation system according to one embodiment of the present invention.

A preferred embodiment of the generation system according to the present invention is shown in Figure. 2. The ozone generation system 7 of FIG. 2 is made up of a number of tubular ozone generation structures 4 aligned within a housing 8 in a side by side relationship. High purity oxygen gas flowing through an inlet 2 is fed into the ozone generation structures 4 of the ozone generator 7 through gas mixer 3. Coolant medium, e.g., liquid nitrogen, is fed through cooling medium inlet 6 into the housing space 9 surrounding the ozone generation structures 4 to cool the ozone generation structures 4 and the reactant gas flowing therethrough. The cooling medium exits the housing space 9 through cooling medium outlet 10 and flows to the cooling medium holding tank 11. Additional cooling medium may be fed to tank 11 through inlet 22. The cooling medium can also be fed to the housing space 9 through inlet 14. The cooling medium can be recirculated to cooling medium inlet 6 by recirculation pump 5.

Supercooled ozone is discharged from the ozone generation means 4 through ozone outlet 12. As used in the present invention, supercooled ozone refers to ozone that exits the generator at a temperature of 10° C. or less, more preferably at a temperature of 0° C. or less, still more preferably between 0° C. and −78° C., most preferably between about −20° C. and −50° C. If appropriate, some of the cooling medium in holding tank 11 can be fed to a heat exchanger/expander 16 through conduit 13. The cooling medium is expanded to form a gaseous cooling medium and then fed to gas mixer 3 through conduit 18. In the mixer 3, the gaseous cooling medium is added to the oxygen preferably in an amount of not greater than about 10% by volume. The coolant gas added to the reactant gas stream helps to cool the oxygen containing gas being fed to the system and increases the efficiency of the production of ozone. Coolant gas may also be fed from heat exchanger/expander 16 through conduit 19 to temperature control unit 20 which functions as a heat exchanger using the coolant gas to reduce the temperature of the ozone further as it exits the system. Coolant may be vented from the system in a number of locations, for example, through vent 24 on unit 20.

Other materials of construction and configurations for the ozone generation system of the present invention will be apparent to the skilled artisan. Appropriate system configurations will often depend upon available equipment, space and economy and accordingly, the skilled artisan will recognize a wide variety of modifications to these preferred embodiments. Although the invention is described in association with the structure shown in FIGS. 1 and 2, the method in its broadest sense could be practiced with other structures.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:

1. An ozone generator system comprising:
   ozone generation means having associated therewith means for introduction a reactant gas;
   means for contacting said ozone generation means with a cooling medium at not greater than about 0° C.;
   means for withdrawing a portion of said cooling medium after it has contacted said generation means;
   means for mixing said portion of said cooling medium with said reactant gas; and
   means associated with said ozone generation means for withdrawing the generated ozone.

2. The ozone generator system of claim 1, wherein said ozone generation means is a corona discharge dielectric.

3. The ozone generator system of claim 2, wherein said corona discharge dielectric is a tubular reactor.

4. The ozone generation system of claim 1, further comprising temperature control means associated with said means for withdrawing ozone.

5. The ozone generation system of claim 4, further comprising means for directing at least a portion of said withdrawn coolant gas to said temperature control means.

6. The ozone generation system of claim 1, wherein said cooling medium is selected from the group consisting of liquid nitrogen, liquified air, liquid oxygen, liquid $CO_2$, or gaseous $CO_2$.

7. A method for producing ozone, comprising:
   flowing reactant gas containing oxygen into an ozone generator to convert a portion of said reactant gas to ozone;
   contacting said ozone generator with a cooling medium at not greater than 0° C. to cool the ozone;
   removing said cooling medium after it contacts said ozone generator;
   converting at least a portion of said cooling medium to a gaseous coolant;
   mixing at least a portion of said gaseous coolant with said reactant gas; and
   withdrawing a product stream containing the ozone generated in said ozone generator.

8. The method for producing ozone of claim 7, wherein the oxygen containing reactant gas has an oxygen content of at least about 90% by volume.

9. The method for producing ozone of claim 7, wherein said ozone generator is a corona discharge dielectric.

10. The method for producing ozone of claim 9, wherein said corona discharge dielectric is a tubularlype reactor.

11. The method for producing ozone of claim 7, further comprising discharging ozone from said ozone generator.

12. The method for producing ozone of claim 11, further comprising controlling the temperature of the ozone as it is discharged from the ozone generator.

13. The method for producing ozone of claim 12, further comprising cooling the discharged ozone with at least a portion of said gaseous coolant.

14. The method for producing ozone of claim 7, wherein the mixture of gaseous coolant and reactant gas includes not greater than 10% by weight of gaseous coolant.

15. The method for producing ozone of claim 7, wherein said cooling medium is selected from the group consisting of liquid nitrogen, liquified air, liquid oxygen, liquid $CO_2$, or gaseous $CO_2$.

16. An ozone generator comprising:

a tubular ozone generator surrounded by a housing;

a gas inlet associated with said generator for introducing a reactant gas;

an inlet associated with said housing for introducing a cooling medium at not greater than about 0° C. between said housing and said generator;

an outlet associated with said generator for withdrawing an ozone containing gas stream;

an outlet associated with said housing for withdrawing said cooling medium;

a recirculator associated with the housing inlet and housing outlet for recirculating at least a portion of said cooling medium;

a converter associated with said housing outlet and said generator inlet for converting at least a portion of said cooling medium to a gaseous coolant; and means for introducing said gaseous coolant into said reactant gas.

17. The ozone generation system of claim 16, wherein said cooling medium is selected from the group consisting of liquid nitrogen, liquified air, liquid oxygen, glycol, liquid $CO_2$, or gaseous $CO_2$.

* * * * *

UNITED STATES PATENT AND TRADEMARK OFFICE
CERTIFICATE OF CORRECTION

PATENT NO. : 6,193,852 B1
DATED : February 27, 2001
INVENTOR(S) : Caracciolo et al.

It is certified that error appears in the above-identified patent and that said Letters Patent is hereby corrected as shown below:

<u>Column 6,</u>
Line 14, "introduction" should read -- introducing --.
Line 59, "tubularlype" should read -- tubular --.

Signed and Sealed this

Seventh Day of August, 2001

*Attest:*

*Attesting Officer*

NICHOLAS P. GODICI
*Acting Director of the United States Patent and Trademark Office*